United States Patent [19]

Chung et al.

[11] Patent Number: 5,404,469

[45] Date of Patent: Apr. 4, 1995

[54] MULTI-THREADED MICROPROCESSOR ARCHITECTURE UTILIZING STATIC INTERLEAVING

[75] Inventors: Jin-Chin Chung, Hsinchu, Taiwan, Prov. of China; Chuan-Lin Wu, Austin, Tex.

[73] Assignee: Industrial Technology Research Institute, Hsinchu, Taiwan, Prov. of China

[21] Appl. No.: 840,903

[22] Filed: Feb. 25, 1992

[51] Int. Cl.⁶ .......................... G06F 9/24; G06F 9/30; G06F 9/38
[52] U.S. Cl. ................................... 395/375; 364/231.8; 364/948.34
[58] Field of Search ................................ 395/375, 800

[56] References Cited

U.S. PATENT DOCUMENTS 5,226,125 7/1993 Balmer ............................ 395/325

FOREIGN PATENT DOCUMENTS 0433864 6/1991 European Pat. Off. .

OTHER PUBLICATIONS

"Distributed Instruction Set Computer Architecture", IEEE Trans. on Computer, 1991, L. Wang and C. L. Wu.
"A Benchmark Evaluation of a Multi-threaded RISC Porcessor Architecture", Proc, of the International Conference on Parallel Processing, 1991, R. G. Prasadh and C. L. Wu.
"Computer Architecture and Parallel Processing" by Kai Hwang & Faye A. Briggs, 1984, McGraw-Hill, Inc, pp. 20–40.

*Primary Examiner*—David Y. Eng
*Attorney, Agent, or Firm*—Meltzer, Lippe, Goldstein, Wolf, Schlissel & Sazer

[57] ABSTRACT

A static interleaving technique solves the problem of resource contention in a very long instruction word multi-threaded microprocessor architecture. In the static interleaving technique, each function unit in the processor is allocated for the execution of an instruction from a particular thread in a fixed predetermined time slot in a repeating pattern of predetermined time slots. The fixed predetermined pattern of time slots represents the resource constraints imposed on the hardware to resolve the contention for computing resources among the instruction threads. The strategy of resource allocation is exposed to a parallel compiler which organizes a sequence of instructions into the horizontal instruction words which form each thread so as to maintain the data dependencies among the instructions and to take into account the fixed predetermined allocation of hardware resources.

11 Claims, 10 Drawing Sheets

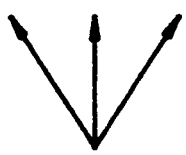

FIG. 2A (PRIOR ART)

| THREAD | FU-1<br>INT. ADD/SUB UNIT | FU-2<br>LOGIC UNIT | FU3<br>FP<-> INT. CONV. UNIT | FU-4<br>FP ADD/SUB UNIT |
|---|---|---|---|---|
| 1 | ADD2 R0, %10, R2<br>NOOP | NOOP<br>SHLL2 R2, %2, R2 | NOOP<br>NOOP | NOOP<br>FADD FR4, FR3, FR3 |
| 2 | ADD2 R0, %5, R4<br>NOOP | SHLL2 R5, %4, R5<br>NOOP | NOOP<br>FMOVEF R4, R5, FR3 | NOOP<br>NOOP |
| 3 | NOOP<br>ADD2 R0, %5, R7 | NOOP<br>SHLL2 R8, %3, R8 | FMOVEF R7, R8, FR2<br>NOOP | NOOP<br>FSUB FR1, FR2, FR2 |

INSTRUCTION BUFFERS

FIG. 2B (PRIOR ART)

| 1 | ADD2 R0, %10, R2 | NOOP | NOOP | NOOP |
|---|---|---|---|---|
| 2 | ADD2 R0, %5, R4 | SHLL2 R5, %4, R5 | NOOP | NOOP |
| 3 | NOOP | NOOP | FMOVEF R7, R8, FR2 | NOOP |

DYNAMIC INTERLEAVING UNIT
CK = 1

| ADD2 R0, %10, R2 | SHLL2 R5, %4, R5 | FMOVEF R7, R8, FR2 | NOOP |
|---|---|---|---|

INSTRUCTION WORD ISSUED TO THE FUNCTION UNITS

FIG. 2C (PRIOR ART)

| DYNAMIC INTERLEAVING UNIT CK = 2 | | | | |
|---|---|---|---|---|
| ① | NOOP | ADD2 R0, %5, R4 | SHLL2 R2, %2, R2 | NOOP | FADD FR4, FR3, FR3 |
| 2 | ADD2 R0, %5, R4 | NOOP | NOOP | NOOP |
| ③ | | | SHLL2 R8, %3, R8 | NOOP | FSUB FR1, FR2, FR2 |

INSTRUCTION WORD ISSUED TO THE FUNCTION UNITS →

| ADD2 R0, %5, R4 | SHLL2 R8, %3, R8 | NOOP | FSUB FR1, FR2, FR2 |
|---|---|---|---|

FIG. 2D (PRIOR ART)

| DYNAMIC INTERLEAVING UNIT CK = 3 | | | | |
|---|---|---|---|---|
| 1 | NOOP | SHLL2 R2, %2, R2 | NOOP | FADD FR4, FR3, FR3 |
| 2 | NOOP | NOOP | FMOVEF R4, R5, FR3 | NOOP |
| 3 | ADD2 R7, %1, R7 | NOOP | NOOP | NOOP |

INSTRUCTION WORD ISSUED TO THE FUNCTION UNITS →

| ADD2 R7, %1, R7 | SHLL2 R2, %2, R2 | FMOVEF R4, R5, FR3 | FADD FR4, FR3, FR3 |
|---|---|---|---|

FIG. 4A

| TIME | FU1 | FU2 | FU3 | FU4 |
|---|---|---|---|---|
| 1 | 1 | | | |
| 2 | 2 | | 1 | 1 |
| 3 | 3 | | 2 | 2 |
| 4 | 4 | 1 | 3 | 3 |
| 5 | 1 | 2 | 4 | 4 |
| 6 | 2 | 3 | 1 | 1 |
| 7 | 3 | 4 | 2 | 2 |
| 8 | 4 | 1 | 3 | 3 |
| 9 | 1 | 2 | 4 | 4 |
| 10 | 2 | 3 | 1 | 1 |
| 11 | 3 | 4 | 2 | 2 |
| 12 | 4 | 1 | 3 | 3 |
| 13 | 1 | 2 | 4 | 4 |
| 14 | 2 | 3 | 1 | 1 |
| 15 | 3 | 4 | 2 | 2 |
| 16 | 4 | 1 | 3 | 3 |
| ⋮ | ⋮ | ⋮ | ⋮ | ⋮ |

FIG. 4B

| HIW# | FU1 | FU2 | FU3 | FU4 |
|---|---|---|---|---|
| 1 | ▨ | | | |
| 2 | | | ▨ | ▨ |
| 3 | | | | |
| 4 | | ▨ | | |
| 5 | ▨ | | | |
| 6 | | | ▨ | ▨ |
| 7 | | | | |
| 8 | | ▨ | | |
| 9 | ▨ | | | |
| 10 | | | ▨ | ▨ |
| 11 | | | | |
| 12 | | ▨ | | |
| 13 | ▨ | | | |
| 14 | | | | ▨ |
| 15 | | | | |
| 16 | | | | |
| ⋮ | ⋮ | ⋮ | ⋮ | ⋮ |

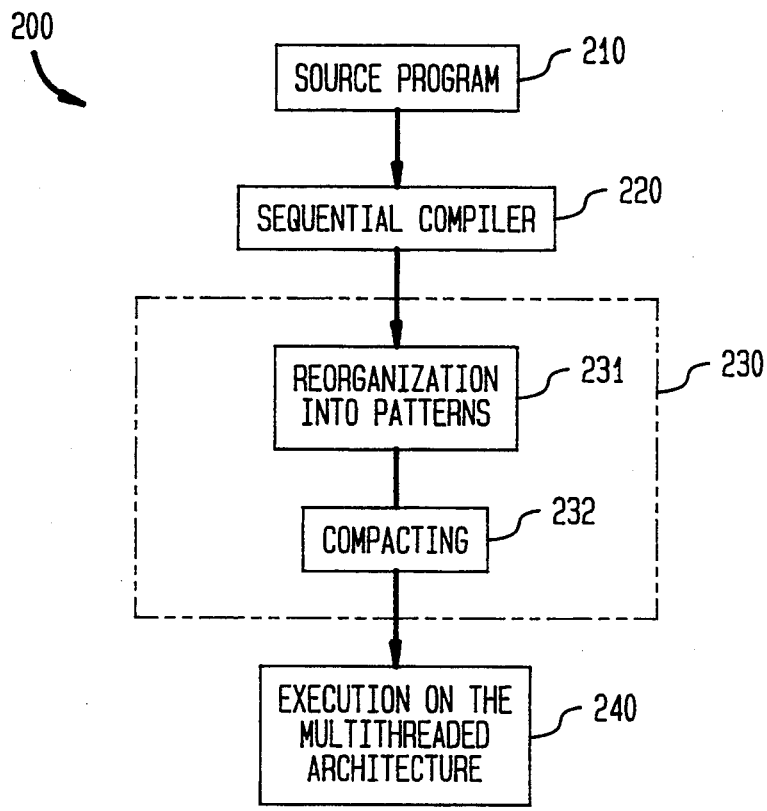

FIG. 7A

ORIGINAL CODE SEQUENCE:
```
LOAD2   R2, %1000, R4
ADD2    R1, %1, R1
SHLL2   R1, %2, R2
CBRAS, < R1, LOOP, R6
```

FIG. 7B

INSTRUCTION SCHEDULING:
AV=[1, 4, 2, 2], T=4, FU_LATENCY=[1, 1, 3, 3]

| HIW# | | | |
|---|---|---|---|
| I   | ADD2 R1, %1, R1 | NOOP              | NOOP |
| I+1 | NOOP            | LOAD2 R2, %1000, R4 | CBRAS, < R1, LOOP, R6 |
| I+2 | NOOP            | NOOP              | NOOP |
| I+3 | NOOP            | NOOP              | NOOP |

FIG. 7C

CODE COMPACTION:
ADD2 R1, %1, R1  SHLL2 R1, %2, R2  LOAD2 R2, %1000, R4  CBRAS, < R1, LOOP, R6

```
        DEF     A         1000;
                ADD2      R0, %0, R7
                ADD2      R0, %996, R9
                ADD2      R0, A, R8
        LBL10   ADD2      R0, %99, R6
                CBRAS, >= R7, LBL11, R6
        LBL9    SHLL2     R6, %2, R2
                ADD3      R2, R9, R4
                ADD3      R8, R2, R5
                LOAD3     R0, R4, R16
                ADD2      R16, %0, R3
                LOAD3     R0, R5, R16
                ADD2      R16, %0, R2
                CBRAS, <= R3, LBL7, R2
                ADD2      R2, %0, R20
                STORE3    R0, R4, R20
                ADD2      R3, %0, R20
                STORE3    R0, R5, R20
        LBL7    SUB2      R0, %1, R2
                ADD3      R6, R2, R6
                CBRAS, <  R7, LBL9, R6
        LBL11   ADD2      R7, %1, R7
                ADD2      R0, %98, R10
                CBRAS, <= R7, LBL10, R10
                STP
```

```
ADD2 R0, %0, R7        NOOP              NOOP                NOOP
ADD2 R0, %996, R9      NOOP              NOOP                NOOP
ADD2 R0, %1000, R8     NOOP              NOOP                NOOP
ADD2 R0, %99, R6       NOOP              NOOP                CBRAS, >=R7, %10, R6
NOOP                   SHLL2, R6, %2, R2 NOOP                NOOP
ADD3 R2, R9, R4        NOOP              LOAD3 R0, R4, R16   NOOP
ADD3 R8, R2, R5        NOOP              NOOP                NOOP
ADD2 R16, %0, R3       NOOP              LOAD3 R0, R5, R16   NOOP
ADD2 R16, %0, R2       NOOP              NOOP                CBRAS, <=R3, %3, R2
ADD2 R2, %0, R20       NOOP              STORE3 R0, R4, R20  NOOP
ADD2 R3, %0, R20       NOOP              STORE3 R0, R5, R20  NOOP
SUB2 R0, %1, R2        NOOP              NOOP                NOOP
ADD3 R6, R2, R6        NOOP              NOOP                CBRAS, <R7, %-8, R6
ADD2 R7, %1, R7        NOOP              NOOP                NOOP
ADD2 R0, %98, R10      NOOP              NOOP                CBRAS, <=R7, %-11, R10
STP                    STP               STP                 STP
```

MULTI-THREADED MICROPROCESSOR ARCHITECTURE UTILIZING STATIC INTERLEAVING

FIELD OF THE INVENTION

The present invention relates to a processor system in which multi-processing techniques are utilized at the function unit level. More specifically, the present invention relates to a very long instruction word (VLIW) based architecture for a microprocessor capable of simultaneously executing multiple instructions threads. A static interleaving technique is utilized to allocate hardware resources to the multiple instruction threads. Specifically, each function unit in the processor is allocated to execute an instruction of a particular thread in a fixed predetermined time slot in a fixed predetermined repeating pattern of time slots. This hardware resource allocation is exposed to a post-pass parallel compiler. The post-pass parallel compiler optimizes each thread of the instruction execution sequence taking into account both data dependencies in the instructions and the allocation of hardware resources

BACKGROUND OF THE INVENTION

The performance of microprocessors has been significantly improved by reducing the instruction execution time and by concurrently executing more than one instruction per cycle, as many RISC superscaler microprocessors are currently designed to do. Today's commercial microprocessors have already achieved a good fraction of the performance level available through supercomputer systems. Furthermore, the significant increase in the clock rate and gate counts expected in the near future for single chip technology make microprocessor technology a very unique tool for obtaining additional supercomputation power in a cost effective manner.

However, the single-threaded pipelined instruction issuing architecture used in the current superscaler microprocessors, such as the i860 and the MC88100, will no longer significantly increase the computational power. The amount of parallelism which exists in a single instruction thread is limited by the data and control dependencies among the instructions. The dependencies slow down the instruction issuing rate and lead to a poor utilization of the function units in the processor. While one function unit is busy, others may be idle waiting for the results from the busy unit.

One way of improving the utilization of the function units is to interleave a plurality of different instruction threads. In this approach, a plurality of instruction threads are executed concurrently.

An instruction thread may be defined as a set of instructions belonging to a particular context. Illustratively, an instruction thread is independent of other instruction threads. Threads can be generated from a single program that exhibits sufficient parallelism or from different programs. Data and control dependencies between instructions in a single thread prevent the simultaneous issuing of instructions to all function units. However, instructions from different threads are independent of each other and can be issued to a plurality of function units concurrently.

In a multi-threaded architecture, multiple contexts are supported by the hardware so that multiple instruction threads can be executed simultaneously without context-switch overhead. Because no context-switch overhead exists among threads which are executed at the same time, both intra-thread and inter-thread instruction level parallelism can be exploited to improve execution rate and processor throughput.

Many multi-threaded architectures have been proposed to achieve higher performance and improved resource utilization in a single chip microprocessor. In R. G. Prasadh and C. L. Wu, "A Benchmark Evaluation of a Multi-threaded RISC Processor Architecture," Proc. of the International Conference on Parallel Processing, 1991, a superscaler architecture based on a VLIW model is proposed to explore the performance of a multi-threaded architecture. A dynamic interleaving technique is proposed to solve the resource contention problem. In G. E. Daddis, Jr. and H. C. Tong, "The Concurrent Execution of Multiple Instruction Streams on Superscaler Processors," Proc. of the International Conference on Parallel Processing, 1991, a system is disclosed wherein there is concurrent processing of two threads on a superscaler processor and wherein an instruction dispatch stack is used to schedule instructions at runtime. A dynamic register allocation technique is utilized to exploit both intra-thread and inter-thread instruction level parallelism.

In these prior art systems, dynamic interleaving and scheduling techniques are used to solve the contention of resources among threads.

The dynamic interleaving technique is now discussed in greater detail. FIG. 1 schematically illustrates a microprocessor 10 which concurrently executes multiple instruction threads using dynamic interleaving.

The processor 10 comprises a plurality of function units 14. The function units are labeled FU-1, FU-2, . . . , FU-N. Illustratively, there are eight such function units and these include a load/store unit that performs memory reads and writes, an integer unit that performs data move and integer add and subtract operations, a logic unit responsible for bit-field operations, an integer/floating point conversion unit to do data type conversions, a floating point adder unit, a floating point multiplier unit, a floating point divide unit and a branch unit. All units are pipelined and are capable of accepting a new instruction in every cycle. Illustratively, in FIG. 1, FU-1 is a load/store unit which accesses a data cache (not shown). The function units 14 are connected via an interconnection network 16 to the register file 18. Each instruction thread executed by the processor 10 has a private register bank in the register file 18. The processor 10 executes T instruction threads labeled 1,2, . . . , T. Thus, the register file 18 comprises T register banks, one for each instruction thread.

Illustratively, each register bank comprises thirty-two 32-bit integer registers and sixteen 64-bit floating point registers. The integer, logic, load/store and branch units can access only the integer registers, while the floating point units are restricted to using the floating point registers. Only the integer/floating-point conversion unit can access registers of either type. All data transfers between the integer and floating-point registers are done by the integer/floating-point conversion unit.

The instruction set utilized by the processor 10 of FIG. 1 is a subset of the RISC instruction set developed for the Distributed Instruction Set Computer. (See, e.g., L. Wang and C. L. Wu, "Distributed Instruction Set Computer Architecture", IEEE Trans. on Computer, 1991; and L. Wang, "Distributed Instruction Set Computer", Ph. D. Dissertation, Univ. Texas, Austin, December 1989; the contents of which are incorporated herein by reference). The instruction set consists of forty-nine machine instructions defined orthogonally in three formats: 3-operand, 2-operand and 1-operand. Illustratively, machine instructions are thirty-two bits in length.

The processor 10 of FIG. 1 executes a compiler. The compiler is comprised of two parts. Its front end transforms a high level program written, for example, in C language, onto a sequence of machine instructions taken from the instruction set described above. The back end of the compiler converts the sequential code into horizontal instruction words (HIWs). A horizontal instruction word comprises a plurality of sections or fields, wherein each field corresponds to a particular function unit and is capable of containing a machine instruction to be executed by that particular function unit. Each instruction thread to be executed by the processor 10 of FIG. 1 is made up of these horizontal instruction words. The compiler generates the horizontal instruction words by combining machine instructions that do not have data dependencies between them. Thus, a horizontal instruction word comprises data-independent instructions that can be issued in the same clock cycle. If there is no instruction for a particular function unit in a horizontal instruction word, the compiler inserts a NOOP (no operation) instruction into the appropriate section of the horizontal instruction word.

In the processor 10 of FIG. 1, the horizontal instruction words of each instruction thread are stored in an individual instruction cache 20. Each instruction cache 20 contains the horizontal instruction words of one instruction thread as compiled by the compiler in the manner described above.

The processor 10 of FIG. 1 also includes the instruction fetch units 24 which fetch instructions from the corresponding instruction caches under the control of the dynamic interleaving unit 26.

Each instruction passes through three main pipeline stages:
1. an instruction fetch stage, wherein an instruction is fetched from its cache,
2. an instruction interleave/decode stage, wherein an instruction is interleaved, if possible, with other instructions from other threads by the dynamic interleaving unit 26, decoded by a decoding unit 27, and issued to the appropriate function unit 14,
3. an execution stage, wherein the instruction is executed by a function unit and the results are written back into the register file 18. The compiler avoids contentions between function units through judicious code scheduling.

In the dynamic interleaving process, the dynamic interleaving unit selects a thread according to a priority scheme such as a round-robin scheme. The dynamic interleaving unit examines the next horizontal instruction word of that thread and replaces, if possible, every one of the NOOP instructions (introduced by the compiler) with a corresponding non-NOOP instruction from another thread. The individual instructions of the newly assembled horizontal instruction word are now sent to the appropriate decoders 27. The instruction decoder at each of the function units identifies the thread to which its instruction belongs and generates the appropriate control signals.

FIGS. 2A, 2B, 2C and 2D show an example illustrating dynamic interleaving. As shown in FIG. 2A, in this example, there are four function units: FU-1 which is an Integer Add/Sub Unit, FU-2 which is a logic unit, FU-3, which is a floating point/integer conversion unit, and FU-4 which is a floating point add/sub unit. There are also three instruction threads labeled 1, 2, and 3 which are stored in corresponding instruction buffers or caches. As shown in FIG. 2A, each instruction buffer contains two horizontal instruction words and each horizontal instruction word contains a section corresponding to each function unit.

The instructions shown in the instruction buffers are scheduled by the compiler statically. The example assumes a round-robin strategy in selecting the threads for interleaving and assumes that each thread has its own register set. As shown in FIG. 2B, at CK=1 (i.e. at a first clock cycle), the first horizontal instruction words from the three threads are fetched from the instruction caches and transmitted into the dynamic interleaving unit. Thread 1 is selected first (shown in bold letters in FIG. 2B). The ADD2 instruction of this thread is sent to the integer unit decoder. There are no more instructions in thread 1. Now thread 2 is selected. Because the ADD2 instruction of thread 1 has already been issued to the integer unit, the issue of the ADD2 instruction of thread 2 is deferred until the next clock cycle. However, the logic unit is free. Hence, the SHLL2 instruction of thread 2 is sent to the logic unit decoder. Because there are no more instructions in this thread, the third thread is selected. The FMOVEF instruction of the third thread is issued to the decoder of the floating-/integer conversion unit as it is free. No more instructions can be issued now. Thus, at CK=1, an ADD2 instruction from thread 1, a SHLL2 instruction from thread 2, and a FMOVEF instruction from thread 3 are issued simultaneously to the function unit decoders.

At the end of the first clock cycle, threads 1 and 3 have no more instructions in the dynamic interleaving unit. Hence, the next horizontal instruction words from these threads are fetched from their respective instruction caches and transmitted into the dynamic interleaving unit. Thread 2, on the other hand, still has an ADD2 instruction to be issued and, therefore, the next horizontal instruction word from thread 2 is not fetched. The three horizontal instruction words which are in the dynamic interleaving unit at CK=2 are illustrated in FIG. 2C. At CK=2, thread 2 is selected first, following the round-robin strategy. Its ADD2 instruction is sent to the integer unit decoder. Next, thread 3 is selected and the SHLL2 and FSUB instructions from this thread are issued to the logic and floating point Add/Sub units, respectively. Finally, thread 1 is selected; but no instruction from thread 1 can be issued since the required function unit decoders are occupied. The process proceeds in a similar manner in the third clock cycle CK3. The instructions stored in the dynamic interleaving unit in the third clock cycle are shown in FIG. 2D as are the instructions issued to the function unit in the third clock cycle. By the end of the third clock cycle, all the instructions from the three threads are issued. In the absence of dynamic interleaving, it would take six clock cycles to issue the instructions in the example. Dynamic interleaving, thus, improves the instruction issue rate by a factor of two in the example.

The basic operation, performed in the dynamic interleaving unit, is the partial decoding of an instruction to see if it is a NOOP instruction. If an instruction is not a NOOP instruction, then the instruction is issued to the function unit decoder where the necessary control signals are generated. If the instruction is a NOOP, then the next instruction from a lower priority thread has to be checked. The checking is continued (in a domino fashion) until a non-NOOP instruction is encountered or until all the threads have been exhausted. The whole operation has to be performed in one clock cycle. FIG. 3 illustrates a logic circuit to achieve this. In FIG. 3, SW1 and SW2 are logic switches whose functions are as shown. The signal ND is the "NOOP Detected" signal, the result of partial instruction decoding, P is the priority signal. In any clock signal, only one thread has its priority signal high; the other priority signals are low. The signal IS the instruction issue signal. When high, it indicates that the instruction from the corresponding thread will be issued to the function unit decoder. The dynamic interleaving unit has a logic circuit, like the one in FIG. 3, for every function unit.

Although dynamic interleaving can achieve higher utilization of function units, some problems remain. First, the hardware has to support a higher instruction fetch bandwidth needed by the NOOP-replacing technique. In addition, implementation of the dynamic interleaving unit requires complex hardware including special hardware needed to detect the completion of one horizontal instruction word of a thread so that the next horizontal instruction word can be fetched and executed. Because all the instructions in the same horizontal instruction word are not guaranteed to be issued in the same clock cycle, two instructions that have write-after-read dependency cannot be put in the same horizontal instruction word. Also, two consecutive horizontal instruction words may be issued in non-consecutive cycles so instructions cannot be put in branch delay slots. These constraints will result in a lower instruction issue rate for a multi-threaded architecture.

In view of the foregoing, it is an object of the present invention to provide a multi-threaded architecture for a microprocessor which overcomes the problems associated with dynamic interleaving.

SUMMARY OF THE INVENTION

Instead of using dynamic interleaving, in accordance with the present invention, a static interleaving technique is utilized to resolve contention in a very long instruction word multi-threaded microprocessor architecture. In the static interleaving technique, each function unit in the processor is allocated for the execution of a machine instruction from a particular thread in a fixed predetermined time slot in a fixed predetermined repeating pattern of time slots. The fixed predetermined pattern of time slots, wherein specific function units are allocated to instructions from specific threads in specific time slots, represents the resource constraints imposed upon the hardware to resolve contention for computing resources. This strategy of resource allocation is exposed to a parallel compiler which, for each thread, organizes a sequence of machine instructions into horizontal instruction words so as to maintain data dependencies among the instruction words and to take into account the fixed predetermined allocation of hardware resources.

In comparison with the prior art microprocessors which utilize dynamic interleaving, a microprocessor which utilizes static interleaving has a decreased hardware complexity. In addition, the static interleaving technique will substantially reduce the code size of a program.

BRIEF DESCRIPTION OF THE DRAWING

FIGS. 2A, 2B, 2C and 2D illustrate the operation of the dynamic interleaving technique.

FIG. 4A illustrates the pattern of time slots utilized in the static interleaving technique of the present invention.

FIG. 4B illustrates a pattern of horizontal instruction words utilized by a post-pass parallel compiler in accordance with the present invention.

FIG. 6 is a flow chart which shows the steps for compiling and executing a program in accordance with the present invention., FIG. 7A, FIG. 7B, and FIG. 7C shows the compilation of a small sequence of instructions in accordance with the present invention.

FIG. 8 illustrates a latency table utilized in the compilation of a program in accordance with the present invention.

FIG. 9A illustrates a sequence of machine instructions and FIG. 9B illustrates the horizontal instruction words formed from the sequence of instructions in accordance with the present invention.

DETAILED DESCRIPTION OF THE INVENTION

Figure 1:
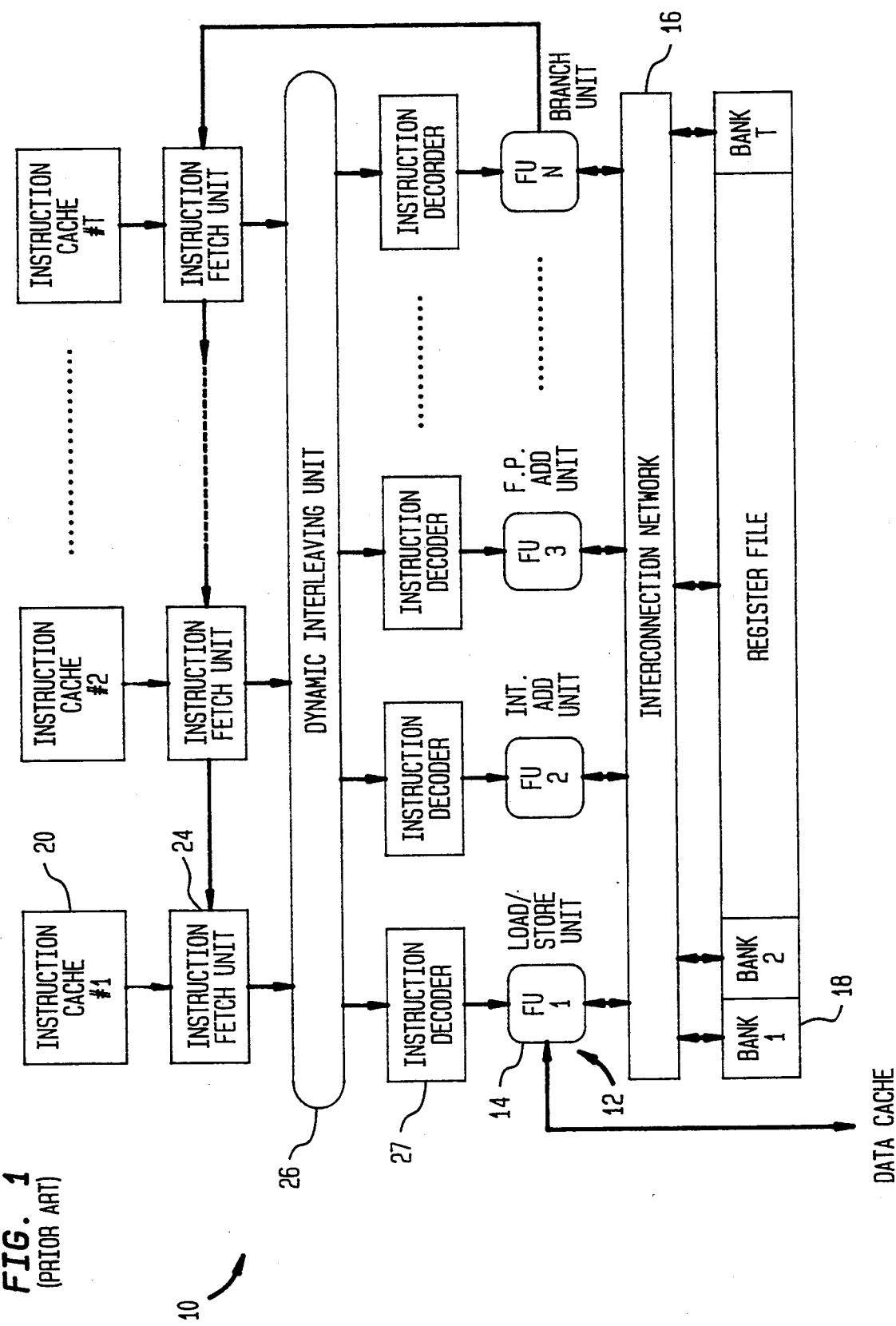
FIG. 1 schematically illustrates a multi-threaded microprocessor architecture which utilizes dynamic interleaving.
Figure 3:
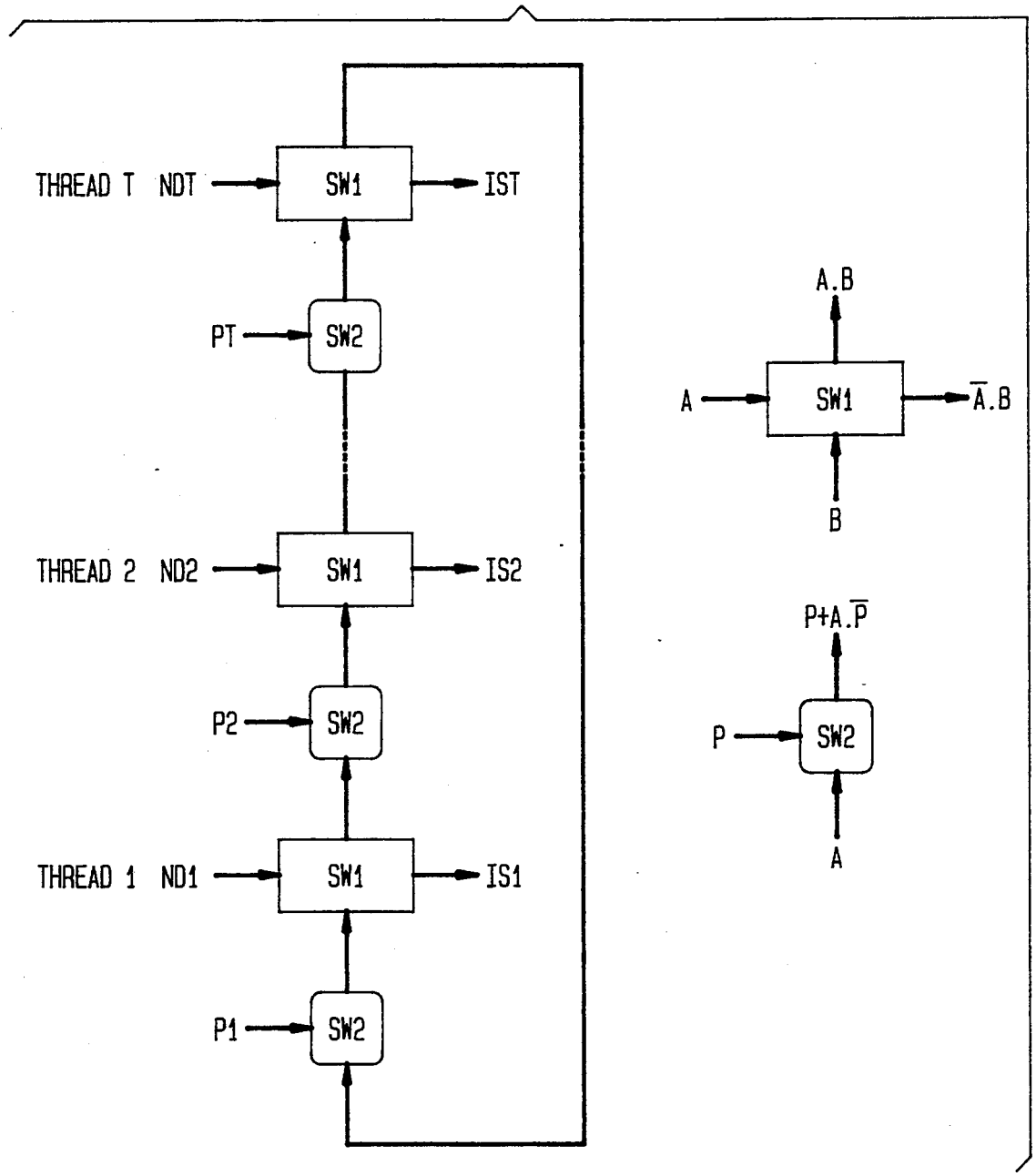
FIG. 3 illustrates a dynamic interleaving unit utilized in the microprocessor of FIG. 1.

In the static interleaving technique, every function unit is allocated to a thread in a round-robin fashion. If a function unit is not used by the selected thread, a NOOP instruction is executed by the function unit.

In general, the static interleaving technique can be characterized by an Allocation Vector (AV). The AV contains an entry, $AV_i$, for every function unit $FU_i$, where $1 \leq AV_i \leq T$ and where T is the number of threads supported by the hardware. During program execution, at time t, $FU_i$ will be allocated to a thread $\tau$, $\tau = 1, 2, \ldots, T$ given by $$\tau = 1 + (t + T - AV_i) \bmod T \quad (1)$$

Consider a four-threaded architecture with four function units FU1, FU2, FU3, and FU4. Given an AV=[1,4,2,2], then the allocation of function units to specific threads is shown in FIG. 4A. In FIG. 4A, each table entry is the number of the thread that can use the corresponding function unit in the specified time slot. It should be noted that the allocation of time slots to function units forms a pattern which repeats itself. In FIG. 4A the pattern repeats itself every four time slots. An algorithm for determining an optimal AV is discussed in detail below.

FIG. 4B schematically illustrates how the allocation of hardware resources specified by the allocation vector is exposed to the post-pass parallel compiler to schedule the instructions of each thread. FIG. 4B shows a list of horizontal instruction words with numbers 1,2,3, . . . . Each horizontal instruction word comprises four sections, with one section corresponding to each function unit. In accordance with the present invention, the parallel compiler can fill only the shaded sections with machine instructions to be executed by the corresponding function units. Unshaded sections receive NOOP instructions. The pattern of horizontal instruction words with particular shaded sections repeats itself every T instruction words where T is the number of threads. As is discussed in greater detail below, each pattern of instructions, which in the example of FIG. 4B, comprises four HIWs, is compacted into a single horizontal instruction word by the parallel compiler. The same pattern of horizontal instruction words is utilized by the compiler to individually schedule the instructions of each thread.

The pattern of horizontal instruction words in FIG. 4B is derived from the allocation vector which in this case is $AV=[1,4,2,2]$. In particular, in a horizontal instruction word with number $H_k$, the field corresponding to the function unit $FU_i$ is shaded if $(H_k+T-1) \bmod T + 1$ is equal to $AV_i$, where in the present example $T=4$.

In other words, the resource constraints, which are imposed by the resource allocation strategy used in the hardware, are represented as a sequence of instruction patterns in the parallel compiler. Each thread is first sequentially compiled and the generated sequential code is scheduled in horizontal instruction words according to this pattern. In the parallel compiler, instructions for each thread generated by the sequential compiler, are scheduled in the pattern in a manner which preserves data dependencies and control dependencies among the instructions. The set of horizontal instruction words making up each pattern is then compacted to form a single horizontal instruction word. The compaction step is discussed in greater detail below.

When all the instruction threads are compiled according to the pattern of FIG. 4B, the threads can be interleaved together as shown in FIG. 4A. Depending on the allocation vector utilized, the starting time of thread #$\tau$ is delayed by $(\tau-1)$ cycles so that resource contention among threads is resolved.

Figure 5:
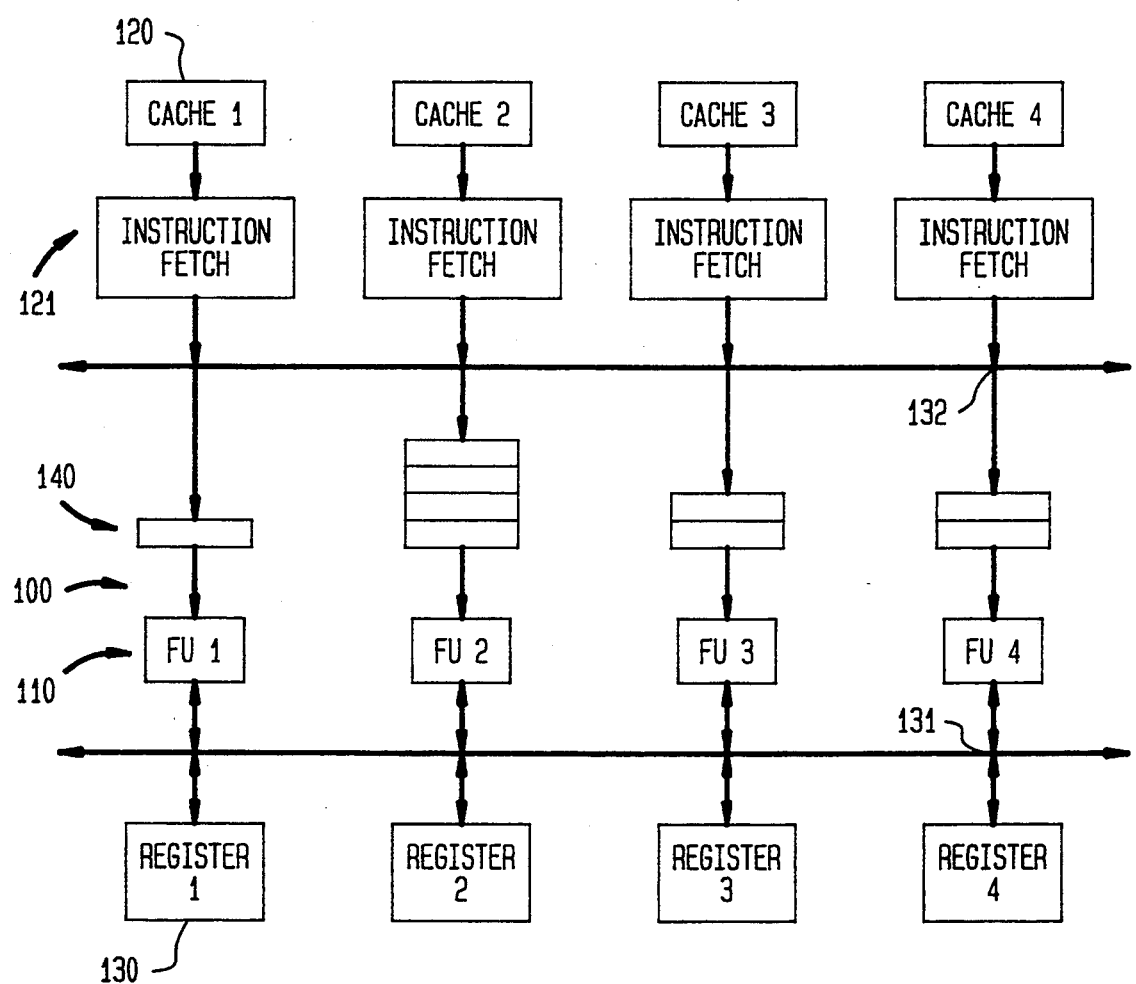
FIG. 5 illustrates a microprocessor which utilizes static interleaving in accordance with the present invention.

FIG. 5 shows a processor 100 which utilizes the static interleaving technique of the present invention. Illustratively, the processor 100 of FIG. 5 is implemented in a single semiconductor chip. The processor 100 comprises four function units FU1, FU2, FU3, FU4. Illustratively, FU1 is an arithmetic unit, FU2 is a logic unit, FU3 is a load/store unit and FU4 is a branch unit. The processor 100 concurrently executes four instruction threads labelled 1, 2, 3, 4 and a separate instruction cache 120 is provided for each of these instruction threads so that there are four caches labeled cache 1, cache 2, cache 3, and cache 4. Each cache 120 stores the horizontal instruction words making up its associated instruction thread. A register bank 130 is provided to store operands for the individual instruction threads, thus the register banks are also labeled 1, 2, 3, 4. When executing an instruction from a particular instruction thread, a function unit can fetch operands from the appropriate register bank and return operands to the register bank after the instruction is executed. The function units 110 access the register bank 130 via the bus 131.

Associated with each function unit 110 is a queue 140. The queues 140 serve to implement the resource allocation defined by the allocation vector. What is meant by this is that the queues insure that each function unit is issued an instruction from a particular instruction thread in the fixed predetermined time slot reserved for that instruction thread in the pattern of time slots.

In the example discussed above the allocation vector is $AV=[1,4,2,2]$. Thus, the queue associated with FU1 has a delay of 1 clock cycle, the queue associated with FU2 has a delay of 4, the queue associated with FU3 has a delay of 2, and the queue associated with FU4 has a delay of 2.

Horizontal instruction words are fetched from the caches 120 alternately in a predetermined order using the instruction fetch units 121. Illustratively, horizontal instruction words are fetched from the caches on a round-robin order starting from cache #1. For each horizontal instruction word fetched, the individual machine instructions contained therein are entered into the queue associated with the function unit which will execute the instruction. The machine instructions are transmitted to the queues 140 via the bus 132. Each individual machine instruction is issued to its appropriate function unit only after it has been delayed by the fixed predetermined delay of the queues. The use of queues with fixed delays determined by the allocation vector in combination with fetching in a predetermined order horizontal instruction words compiled in accordance with a pattern derived from the allocation vector insures that individual machine instructions from particular threads are issued to particular function units in the fixed predetermined time slots reserved for the particular instruction thread.

A major advantage of the static interleaving technique is that the completion time of an instruction is known at compile time and hence a parallel compiler can optimize the execution sequence of the instructions.

FIG. 6 is a flow chart 200 which shows the steps utilized to compile and execute a program in accordance with the present invention. First, a source program 210 written in a high level language, such as C language, is compiled in a sequential compiler (step 220). The sequential compiler converts the high level program into a sequence of machine instructions. Then, a parallel compiler reorganizes (step 230) the sequence of machine instructions into horizontal instruction words. This is done in two steps. In a first step (step 231), each machine instruction is placed in a location in a pattern of instructions, which pattern comprises a plurality of horizontal instruction words. The location of each machine instruction in a pattern of instructions depends upon the allocation of hardware resources as determined by the allocation vector and data dependencies among the instructions. In a second step (step 232), the horizontal instruction words of each pattern are compacted into a single horizontal instruction word to form an instruction thread. After the processing by the parallel compiler, the compacted horizontal instruction words of a thread are stored in a cache and executed by the function units (step 240 of FIG. 6) in the manner described above in connection with FIG. 5.

FIGS. 7A, 7B, and 7C illustrate the compiling process for the case where the allocation vector is $AV=[1,4,2,2]$ and where the function units FU1, FU2, FU3, FU4 are arithmetic, logic, load/store, and branch units, respectively.

FIG. 7A illustrates a piece of sequential code comprised of four machine instructions. (For example, the "load2" instruction means that the content of memory addressed by the content of register r2 plus 1000 is loaded into register r4. Similarly, the "cbras<" instruction mean that if the content of register r1 is less than the content of register r6, go back to the first instruction).

FIG. 7B illustrates how the four instructions of FIG. 7A are placed in the pattern of four horizontal instruction words illustrated in FIG. 4B. Specifically, the sequence of instructions of FIG. 7A are placed in the shaded sections of the HIWs 1–4 of FIG. 4B. Unshaded sections of HIWs 1–4 of FIG. 4B receive NOOP instructions. FIG. 7C shows how the pattern of four instruction words of FIG. 7B is compacted into a single horizontal instruction word. Compaction reduces the code size by eliminating a lot of NOOP instructions.

A machine instruction $I_j$ in the sequence of instructions produced by the sequential compiler is placed in a particular horizontal instruction word with number $H_j$ (see FIG. 4B) as follows. Every machine instruction $I_j$ is compared with all the previously scheduled instructions to determine data dependencies. The instruction $I_j$ is moved up as far as possible until the beginning of the sequence or until some instruction $I_i$ is found such that there is a data dependency between $I_j$ and $I_i$. Then the horizontal instruction word that $I_j$ can be put into is $$H_j = H_i + L[D][T_i][T_j] \quad (2)$$

where
- $H_i$: The HIW number where $I_i$ is put into
- $H_j$: The HIW number that $I_j$ can be put into
- $T_i$: The instruction type of instruction $I_i$
- $T_j$: The instruction type of instruction $I_j$
- D: The data dependency type between $I_i$ and $I_j$; either read-after-write (RAW) or write-after-read (WAR))
- L: The latency table for the particular AV If $I_j$ has a resource contention with an instruction in HIW $H_j$, then $I_j$ is delayed by T cycles, where T is the number of threads supported by the hardware. If it is conflicted again, $I_j$ is delayed by another T cycles. This search process is repeated until an HIW where $I_j$ can be put is found. In the computation of $H_j$, a latency table L is used to determine the latency between $I_j$ and $I_i$. Given D, $T_i$, $T_j$ and FU_LATENCY which is the execution time of each instruction type defined in hardware, then $L[D][T_i][T_j]$ is computed as shown in the following C program:

```
switch(D) {
  case 1:/*RAW(read-after-write)dependency*/
    temp2=((temp1=AV[T_j]-AV[T_i])>0?temp1:temp1+T;
    while (temp2<FU_LATENCY[T_i]) temp2+=T;
    L[D][T_i][T_j]=temp2;
    break;
  case 2:/*WAR(write-after-read) dependency*/
    L[D][T_i][T_j]=((temp1=AV[T_j]-
    AV[T_i])>=0?temp1:temp1+T);}
```

It should be noted that temp1 and temp2 are temporary variables The computed latency is different from the execution time defined in hardware. In the computation of the latency table, there is considered dependency type (i.e. RAW wherein D=1 or WAR where D=2), execution time of each instruction, and the AV. Once the latency table is computed, the parallel compiler can use it to determine the location of each instruction in the execution schedule using equation(2).

FIG. 8 illustrates an example of the latency table $L[1][T_i][T_j]$ for the AV=[1,4,2,2], FU_LATENCY[$T_i$]=1, and D=1 (i.e. for an RAW data dependency). In this case, the instruction types $T_i$ and $T_j$ may be identified by the function units $FU_i$ and $FU_j$ which execute these instructions. Thus for example, according to the table of FIG. 8, the latency between an instruction $I_i$ executed by FU3 and instruction $I_j$ executed by FU2 is 2 cycles.

FIG. 9A and FIG. 9B illustrate a sample compilation. FIG. 9A illustrates the sequence of machine instructions generated by the sequential compiler for a bubble sort program. FIG. 9B illustrates the horizontal instruction words produced by the post pass parallel compiler after compaction.

The selection of the allocation vector is important to the static interleaving technique of the present invention. One way of choosing the allocation vector is to choose an allocation vector that will reduce the latency of the most frequently occurring read-after-write (RAW) dependencies. Given a distribution of RAW dependencies among instructions in one or more benchmark programs, the AV is chosen such that the following equation can be minimized $$\sum_{i=1}^{i=M} \sum_{j=1}^{j=M} (L[1][i][j] * W[i][j])$$

where
- M: the number of functional units in the architecture
- L: the latency table defined by a AV
- W[i][j]: the possibility of RAW dependency between instruction type i and j Finally, the above-described embodiments of the invention are intended to be illustrative only. Numerous alternative embodiments may be devised by those skilled in the art without departing from the spirit and scope of the following claims.

We claim:

1. A microprocessor capable of concurrently executing a plurality of instruction threads comprising:
   a processor comprising a plurality of function units,
   a means for storing horizontal instruction words forming a plurality of instruction threads, wherein each of said function units can be shared among said plurality of threads and each horizontal instruction word contains one or more machine instructions to be executed by particular ones of said function units,
   means for fetching from said storing means horizontal instruction words belonging to different ones of said threads at predetermined times and in a predetermined order, and
   means for allocating each of said function units for the execution of a machine instruction from a particular instruction thread in a fixed predetermined time slot in a fixed predetermined repeating pattern of time slots, wherein said allocation means comprises queues for providing a fixed predetermined delay for each machine instruction in each of said horizontal instruction words in said instruction threads so that each machine instruction is applied to the appropriate function unit in the appropriate allocated time slot.

2. The microprocessor of claim 1 wherein specific time slots in said pattern of time slots are allocated to specific function units for the execution of machine instructions from specific ones of said threads to minimize the latency of read after write dependencies in said machine instructions.

3. The microprocessor of claim 1 wherein said fetching means fetches horizontal instruction words from said storing means in a round-robin order.

4. The microprocessor of claim 1, wherein said storing means comprises a plurality of individual caches, each individual cache associated with one of said instruction threads.

5. The microprocessor of claim 1 wherein said horizontal instruction words of each thread are compiled by a compiler which reorganizes a sequence of machine instructions into a sequence of patterns of instructions comprising a plurality of horizontal instruction words, each machine instruction having a location in a pattern depending on its data dependencies with other machine instructions and the particular time slots allocated to particular function units for the execution of instructions from particular threads.

6. The microprocessor of claim 1, wherein said allocating means comprises an allocation vector and a compiler and wherein said compiler schedules said instructions into horizontal instruction words according to said allocation vector.

7. The microprocessor of claim 6, wherein said compiler compacts said scheduled horizontal instruction words thereby reducing bus bandwidth required by said fetching means.

8. A method for compiling and executing one instruction thread from a plurality of instruction threads in a multi-threaded processor system, said processor system comprising a processor including a plurality of function units comprising,
    allocating said function units in accordance with an allocation vector for the execution of instructions from specific ones of said threads in specific fixed predetermined time slots in a fixed predetermined repeating pattern of time slots,
    utilizing queues to provide a fixed predetermined delay for each instruction so that each instruction is applied to the appropriate function unit in the appropriate predetermined time slot,
    utilizing a sequential compiler to compile a source program into a sequence of machine instructions which can be executed by particular function units in said processor system,
    utilizing a parallel compiler to reorganize said sequence of machine instructions into a sequence of patterns of instructions, each instruction having a location in a pattern of instructions depending on its data dependency with a previous instruction in said sequence of instructions and depending on said allocation vector which defines the time slots in which the appropriate function unit will be available to execute the instruction,
    utilizing said parallel compiler to compact the instructions of each pattern of instructions into a horizontal instruction word to form said one instruction thread,
    storing the instructions of said one instruction thread in a cache, and
    executing said instructions of said one instruction thread using said function units.

9. A method for concurrently executing a plurality of instruction threads in a multi-threaded processor including a plurality of function units and a cache system for storing horizontal instruction words comprising each of said threads, each horizontal instruction word containing one or more instructions to be executed by particular ones of said function units, said method comprising the steps of
    fetching from said cache system horizontal instruction words belonging to different ones of said threads at predetermined times and in a predetermined order,
    allocating each of said function units for the execution of an instruction from a particular thread in a fioxed predetermined time slot in a fixed predetermined repeating pattern of time slots,
    utilizing queues to provide a fixed predetermined delay for each instruction so that each instruction is applied to the appropriate function unit in the appropriate predetermined time slot, and
    executing said instruction in said horizontal instruction words by said function units in said allocated time slots.

10. The method of claim 9 wherein each of said threads is compiled by the steps of:
    utilizing a sequential compiler to compile a source program into a sequence of machine instructions which can be executed by particular function units in said processor,
    utilizing a parallel compiler to reorganize said sequence of machine instructions into a sequence of patterns of instructions, each instruction having a location in a pattern of instructions depending on its data dependency with a previous instruction in said sequence of instructions and depending on an allocation vector which defines the time slots in which the appropriate function unit will be available to execute the instruction, and
    utilizing said parallel compiler to compact the instructions of each pattern of instructions into a horizontal instruction word to form said one instruction thread.

11. A microprocessor for executing a plurality of instruction threads comprising
    a plurality of function units,
    a plurality of instruction caches, each for storing horizontal instruction words of one thread,
    a plurality of instruction fetch units for fetching horizontal instruction words from corresponding ones of said caches, and
    an allocator for allocating each of said function units for the execution of a machine instruction from a particular instruction thread in a fixed predetermined time slot in a repeating pattern of time slots in accordance with an allocation vector which minimizes read after write latencies in machine instructions in said horizontal instruction words, wherein said allocation means comprises queues for providing a fixed predetermined delay for each machine instruction in each of said horizontal instruction words in said instruction threads so that each machine instruction is applied to the appropriate function unit in the appropriate allocated time slot.

* * * * *